United States Patent [19]

Awadalla et al.

[11] Patent Number: 5,223,023
[45] Date of Patent: Jun. 29, 1993

[54] RECOVERY OF GOLD FROM SOLUTION BY REDUCTION-PRECIPITATION WITH STABILIZED ALKALI METAL BOROHYDRIDE

[75] Inventors: Farouk T. Awadalla, Hull; Gordon M. Ritcey, Nepean, both of Canada

[73] Assignee: Her Majesty the Queen in right of Canada, as represented by the Minister of Energy, Mines and Resources, Canada

[21] Appl. No.: 649,388

[22] Filed: Jan. 30, 1991

[30] Foreign Application Priority Data

Mar. 30, 1990 [CA] Canada ................................ 2013537

[51] Int. Cl.$^5$ ................................................ C22B 3/22
[52] U.S. Cl. ........................................................ 75/741
[58] Field of Search ............................. 75/741; 423/24

[56] References Cited

U.S. PATENT DOCUMENTS

| 4,096,316 | 6/1978 | Tamai et al. | 75/370 |
| 4,913,730 | 4/1990 | Deschenes et al. | 75/370 |
| 4,992,200 | 2/1991 | Lin et al. | 423/24 |

FOREIGN PATENT DOCUMENTS

| 1197986 | 12/1985 | Canada | 75/741 |
| 158828 | 12/1981 | Japan | 75/741 |

OTHER PUBLICATIONS 55-158828 Japan Abstracts Dec. 7, 1981.

*Primary Examiner*—Melvyn J. Andrews
*Attorney, Agent, or Firm*—Sughrue, Mion, Zinn, Macpeak & Seas

[57] ABSTRACT

A process is disclosed for the direct recovery of gold from thiourea, thiocyanate or thiosulfate solutions or acidified thiourea leach liquor. The process comprises reduction precipitation of the gold from solution by the addition of stabilized alkali metal borohydride, preferably sodium or potassium borohydride, at ambient temperature and pressure. The resulting gold precipitate is generally of high purity and is readily separated by filtration. The barren solution is in a condition such that it can be recycled to the upstream process.

24 Claims, 4 Drawing Sheets

RECOVERY OF GOLD FROM SOLUTION BY REDUCTION-PRECIPITATION WITH STABILIZED ALKALI METAL BOROHYDRIDE

BACKGROUND OF THE INVENTION

1. Field of the Invention

This invention relates to a process for the recovery of metallic gold from gold-containing thiourea, thiosulfate or thiocyanate solutions. The invention further relates to a process for the recovery of metallic gold generally of high purity from pregnant solutions as a result of the leaching of gold ore or concentrates by acidified thiourea.

2. DESCRIPTION OF THE RELATED ART

Hitherto, there have existed two principal methods of recovering gold from gold ores or gold concentrates. The first method involves cyanidation followed by the Merill-Crowe process wherein gold is recovered from solution by cementation with zinc powder which must then be refined to obtain gold metal. The process offers high gold recovery, but with low purity. The second method comprises cyanidation followed by recovery using activated carbon followed by electrolysis. The carbon-in-pulp (CIP) process involves contact between the activated carbon and leached pulp. Absorption of impurities onto the carbon and the difficulties of desorption of the gold are distinct disadvantages of this process. The carbon-in-leach (CIL) process involves loading the gold onto the carbon during leaching. In both the CIL and CIP processes, the precious metal must be eluted and passed to an electrowinning step for gold recovery. Gold recovered on the cathode then requires further refining. The activated carbon can be regenerated and then recycled.

Each of the these prior methods involves cyanidation. Because of the toxicity of cyanide, additional steps are required for its handling and subsequent elimination. This significantly increases the operating costs of these processes.

A recently proposed less toxic alternative to cyanide for leaching gold ore or gold concentrate is thiourea. However, thus far, there is no well established method of recovering gold from non-toxic reagents such as thiourea solution. Attempts have been made to recover gold by thiourea leaching followed by precious metal recovery from solution by aluminum cementation, activated carbon, ion exchange, solvent extraction and electrolysis. However, these prior methods all have one or more disadvantages. As well, there is often thiourea decomposition during gold recovery from the pregnant solution which adds cost by decreasing the amount of barren thiourea that can be recycled.

Thiourea is currently an effective eluate for resin loaded with gold cyanide complex and as a stripping agent for gold from organic solvent loaded with gold from cyanide media. However, no satisfactory method has been developed to recover gold from such solutions.

One method of recovering gold from such thiourea solutions involves neutralizing the acidified thiourea solution to a pH of about 6.5 which results in the precipitation of gold due to pH change. However, the method is non-selective and uneconomical due to the acid consumption necessary to readjust the solution pH if the thiourea is to be recycled. As well, thiourea is relatively unstable at a pH above 4.

Hydrogen reduction is another method that has been used to recover gold from thiourea solution. This process requires high temperatures and pressures and the use of a catalyst which contributes to high operating costs. As well, the reaction kinetics are quite slow.

Electrolysis has also been used in the recovery of gold from thiourea solution on a commercial basis. This method requires an elaborate two-stage electrolysis circuit with special cell design in order to obtain sufficiently high recoveries.

The reducing power of sodium borohydride has long been exploited for industrial applications such as pollution control and the removal and/or recovery of various metal cations from solution. Currently, sodium borohydride is finding application in the recovery of silver from spent photographic liquor (thiosulfate solution), as disclosed in U.S. Pat. No. 3,082,079, or spent electrolyte and platinum group metals from acidic leach liquor. Also, heavy metal cations such as $Cu^{2+}$, $Fe^{3+/2+}$, $Ni^{2+}$, $Hg^{2+}$, $Co^{2+}$ and $Pb^{2+}$ can be removed from toxic effluents by sodium borohydride treatment. However, there has been no suggestion of a sodium borohydride reduction process for the recovery of gold from leach liquors. Dietz, Jr. et al (Canadian Patent No. 1,090,584) teach a reduction precipitating agent containing aluminum, an alkali metal borohydride and a hydrazine compound for recovering precious metal values including gold from aqueous alkaline cyanide solutions. This prior process suffers from cyanide effluent problems as well as material losses due to the necessity for cyanide effluent destruction.

SUMMARY OF THE INVENTION

It is an object of this invention to provide a simple and economic method for recovering high purity metallic gold directly from aqueous solutions including thiourea, thiosulfate and thiocyanate solutions.

It is a further object of this invention to provide a method for the recovery of metallic gold from thiourea leach liquor resulting from the leaching of gold ore or concentrate by acidified thiourea.

Accordingly, the invention provides a process for recovering high purity metallic gold from an acidic solution containing gold values, which comprises: adding to the solution stabilized alkali metal borohydride, preferably sodium or potassium borohydride, in an amount at least stoichiometrically equal to the amount of gold compounds present in solution; separating the resultant metallic precipitate by filtration; and, optionally, recycling the barren solution to the upstream process.

In a preferred embodiment of invention, reduction precipitation is effected by stabilized sodium borohydride in the form of Ven Met TM solution (12% $NaBH_4$, 40% NaOH).

In a further preferred embodiment, reduction precipitation is effected by stabilized potassium borohydride.

DETAILED DESCRIPTION OF THE INVENTION

Extensive study has revealed that an important factor in the use of stabilized sodium borohydride for reduction precipitation is pH control. Normally, borohydride reduction is effected at a pH of from 5.0 to 7.0. Below a pH of 5.0 borohydride tends to hydrolyze which results in an increased consumption of the borohydride. On the other hand, thiourea is stable in acidic medium, but at higher pH levels undergoes degradation. Therefore, it was unexpected when it was found that sodium borohydride reduction in an acidic solution of thiourea was efficient. It appears that the alkaline content of Ven Met TM solution acts to stabilize sodium borohydride in an acidic pH range and substantially prevents its hydrolysis. Through extensive experimentation it was found that the reduction efficiency of stabilized sodium borohydride peaked at approximately pH 2.5. Furthermore, it was found that more than satisfactory reduction efficiency occurred when using stabilized sodium borohydride in the pH range of about 1.5 to 3.0.

Analysis has shown that the concentration of thiourea in the pH range of 1.0 to 3.0 is stable before and after the reduction reaction. It is the stability of thiourea during the reaction that allows it to be in recyclable condition which contributes significantly to reducing the operating cost of the process.

For gold-containing thiosulfate solution, peak efficiency for reduction precipitation is at about pH 6.0. In the pH range below 4.0, a yellowish-white precipitate forms.

For gold-containing thiocyanate solution, maximum reduction efficiency occurs at about pH 2.5.

For gold-containing thiourea solution, reaction by the addition of stabilized sodium borohydride in the form of Ven Met TM solution was found to reach maximum efficiency after thirty seconds. For gold-containing thiosulfate solution, maximum efficiency of the reduction reaction was found to occur after 1 hour at pH 6.0. For gold-containing thiocyanate solution, maximum efficiency was found to occur after about 30 minutes.

The reduction precipitation of gold in gold-containing thiourea solution proceeds according to the following reaction:

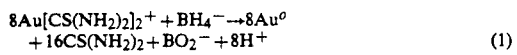

$$8Au[CS(NH_2)_2]_2^+ + BH_4^- \rightarrow 8Au^0 + 16CS(NH_2)_2 + BO_2^- + 8H^+ \quad (1)$$

It can be clearly seen in equation (1) that eight electrons per molecule of sodium borohydride are available to reduce gold ions. When complexed with acidic thiourea, gold is present in monovalent form. Thus, according to the stoichiometry of the reaction, eight moles of gold are reduced for each mole of sodium borohydride. In practice, however, an excess amount of $NaBH_4$ is required as a result of the necessity for a low pH. It has been found that the stoichiometric amount of sodium borohydride increases as pH decreases. For example, for pH values of 1.5, 2.0, 2.5 and 3.0, molar ratios of 100, 25, 10 and 3, respectively, of $NaBH_4/Au$ were required to effect reduction. For thiosulfate and thiocyanate gold-containing solutions, the stoichiometry is even less than unity as a result of the pH of reaction being nearly neutral (pH~6.0).

It has further been found that the concentration of gold has little effect on the efficiency of the $NaBH_4$ reduction reaction. As can clearly be seen in Table 1, the percentage recovery of gold remains substantially constant over a large range of gold concentration (from 2 to 100 mg Au/L solution). This is a significant advantage of the invention which allows application of the process to solutions of thiourea as both a lixiviant (wherein the resultant leach liquor has rather small gold concentrations) and a stripping solution (wherein gold concentrations are high).

TABLE 1

Reduction of gold ion by SBH in thiourea solution containing different concentrations of gold
(Conditions: V = 100 mL, stoichiometry (mole SBH/mole Au) = 9.4, thiourea = 7 g/L, initial pH = 2.5, time = 2 min)

| $Au^+$ concn. mg/L | pH, final | Au in solution mg/L | Au recovery, % |
|---|---|---|---|
| 2 | 2.58 | 0.06 | 97.0 |
| 5 | 2.73 | 0.16 | 97.0 |
| 10 | 3.18 | 0.0 | 100.0 |
| 20 | 10.29 | 0.0 | 100.0 |
| 50 | 9.12* | 0.0 | 100.0 |
| 100 | 2.23** | 0.05 | 99.95 |

*Initial pH = 2.0, at pH > 2.0 gold start to precipitate
**Initial pH = 1.5 because at pH > 1.5, precipitation of gold started Accordingly, reduction precipitation using sodium borohydride is effective in thiourea solutions substantially independent of gold concentration. Barren thiourea solution, after the separation of precipitated metal, was found to contain less than 0.2 mg Au/L.

In untreated thiourea leach liquors, precious metals contained therein are usually associated with foreign contaminating ions such as copper, iron, cobalt, nickel and zinc. Therefore, it is necessary to know their effect on the reduction of gold using sodium borohydride.

It has been found by experimentation that the presence of zinc ions enhances the reduction efficiency of gold. For example, the presence of 10 mg/L zinc ion in thiourea solution containing 10 mg/L gold was found to decrease sodium borohydride consumption by 83% independent of pH within the operable pH range for thiourea. Furthermore, the gold precipitate was analyzed to be zinc free. It appears that sodium borohydride is inefficient at reducing zinc ion.

The presence of other metal ions such as iron (II), cobalt, nickel and copper were found to produce a negative affect on gold reduction by sodium borohydride. The amount of decrease in reduction efficiency varied with each ion in the following order: Fe>Co=Ni>Cu. The precipitated product obtained in the presence of these ions was analyzed to be substantially pure gold indicating that although their presence hinders the reduction efficiency, they are not reduced to any significant degree. That is, they do not contaminate the final product. Therefore, the inventive process is still operable for gold-containing solutions which also contain the contaminating ions Fe, Co, Ni and Cu.

It has further been found that the presence of silver enhances the reduction efficiency of gold with sodium borohydride in thiourea solution. Moreover, the reduction efficiency increases as the concentration of silver increases. For example, it was found that in the presence of 10 mg/L and 100 mg/L of silver ion, the amount of $NaBH_4$ consumed decreased by 33% and 83%, respectively, over the amount consumed when no silver was present. Therefore, in cases where gold and silver are in a mixture, reduction can be performed in two stages to precipitate gold and silver metal separately in good yield and high purity. It can be seen in Table 2 that the reduction of gold in thiourea in the presence of silver, copper and iron (II) in only one stage resulted in a product of medium purity. However, as shown in Table 3, if reduction is effected in two stages, gold and silver precipitate separately in good yield and high purity.

TABLE 2

Reduction of mixture with SBH in one stage
Composition of solution, mg/L = Au = 50, Ag = 50, Cu= 25
and Fe = 25, Tu = 7 g/L, V = 100 cc, time = 5 min, T =
25° C., pH initial = 1.66, SBH/Au = 12.5

| Metal ion | Concn. of barren solution, mg/L | Recovery, % | Purity of product, % |
|---|---|---|---|
| Au | 0.63 | 98.74 | 57.0 |
| Ag | 17.09 | 65.82 | 38.0 |
| Cu | 21.5 | 14.00 | 4.0 |
| Fe | 24.22 | 3.12 | 1.0 |

TABLE 3

Reduction of mixture with SBH in two stages
Initial pH = 1.5 and 2.68 for 1st and 2nd stage
1st stage SBH/Au = 9.375
2nd stage SBH/Au = 3.125

| Metal ion | Concn. of metal ion in barren solution mg/L | | Recovery, % | | Purity, % | |
|---|---|---|---|---|---|---|
| | 1st stage | 2nd stage | 1st stage | 2nd stage | 1st stage | 2nd stage |
| Au | 5.348 | 1.24 | 89.30 | 76.85 | 83.2 | 10.9 |
| Ag | 45.2 | 13.88 | 9.60 | 69.30 | 8.9 | 82.8 |
| Cu | 21.19 | 21.48 | 7.60 | 0.0 | 7.1 | 0.0 |
| Fe | 24.58 | 22.19 | 0.84 | 9.7 | 0.8 | 6.3 |

In the temperature range of 25° to 80° C. reduction efficiency was found to be substantially stable. A slightly increased efficiency was obtained at higher temperatures. However, it was found that the increased efficiency achieved was more than offset by the increased cost associated with the higher reaction temperature. Accordingly, ambient temperature is the preferred temperature to effect reaction.

The recovery of gold from solutions using stabilized sodium borohydride in the form of Ven Met TM solution is efficient, fast, simple and low in cost. In terms of cost it is estimated that at present prices one pound of high purity gold can be recovered through the use of $10 worth of Ven Met TM solution, based on a per pound Ven Met TM solution price of $2.3 to $3.3.

A key advantage of the invention is that recovery of high purity gold by reduction precipitation with a stabilized alkali metal borohydride can be employed in the final steps of already established and commercially viable gold recovery processes as will be demonstrated in the following paragraphs.

BRIEF DESCRIPTION OF THE DRAWINGS

Further objects, features and advantages of the invention will become apparent to those skilled in the art from the following description thereof when taken in conjunction with the accompanying drawings, in which.

DESCRIPTION OF THE PREFERRED EMBODIMENTS

Figure 1:
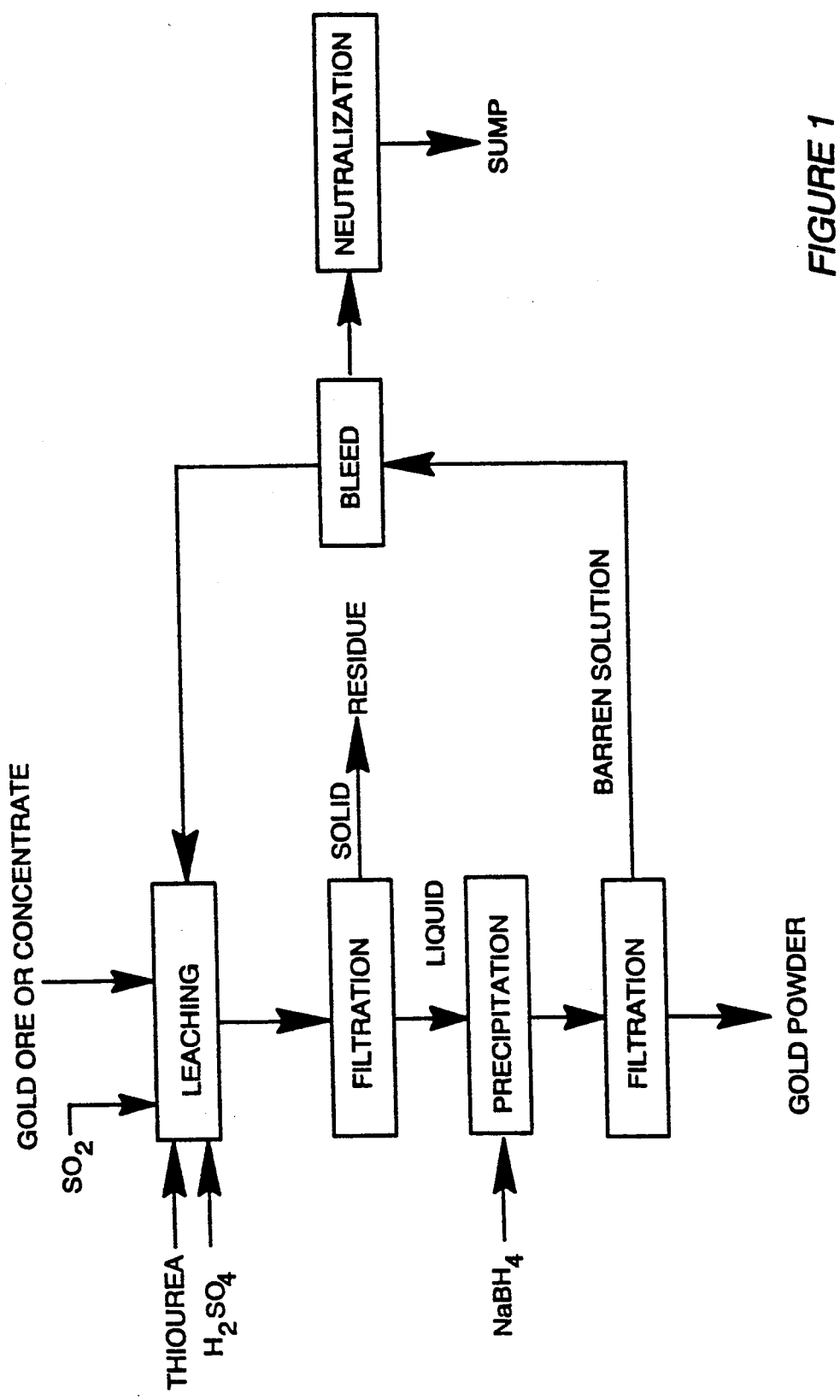
FIG. 1 shows a process flowsheet for the leaching of gold ore or concentrate by acidified thiourea which includes a recovery step as embodied by the invention.

With reference to FIG. 1, in a preferred embodiment of invention gold ore or concentrate is leached by acidified thiourea. Any solid residue remaining in solution is separated by filtration and the resultant liquid is treated with stabilized sodium borohydride to effect reduction precipitation. Precipitated gold powder is recovered by filtration and the barren solution is optionally (upon treatment for impurity control) recycled to the upstream leaching stage.

Figure 2:
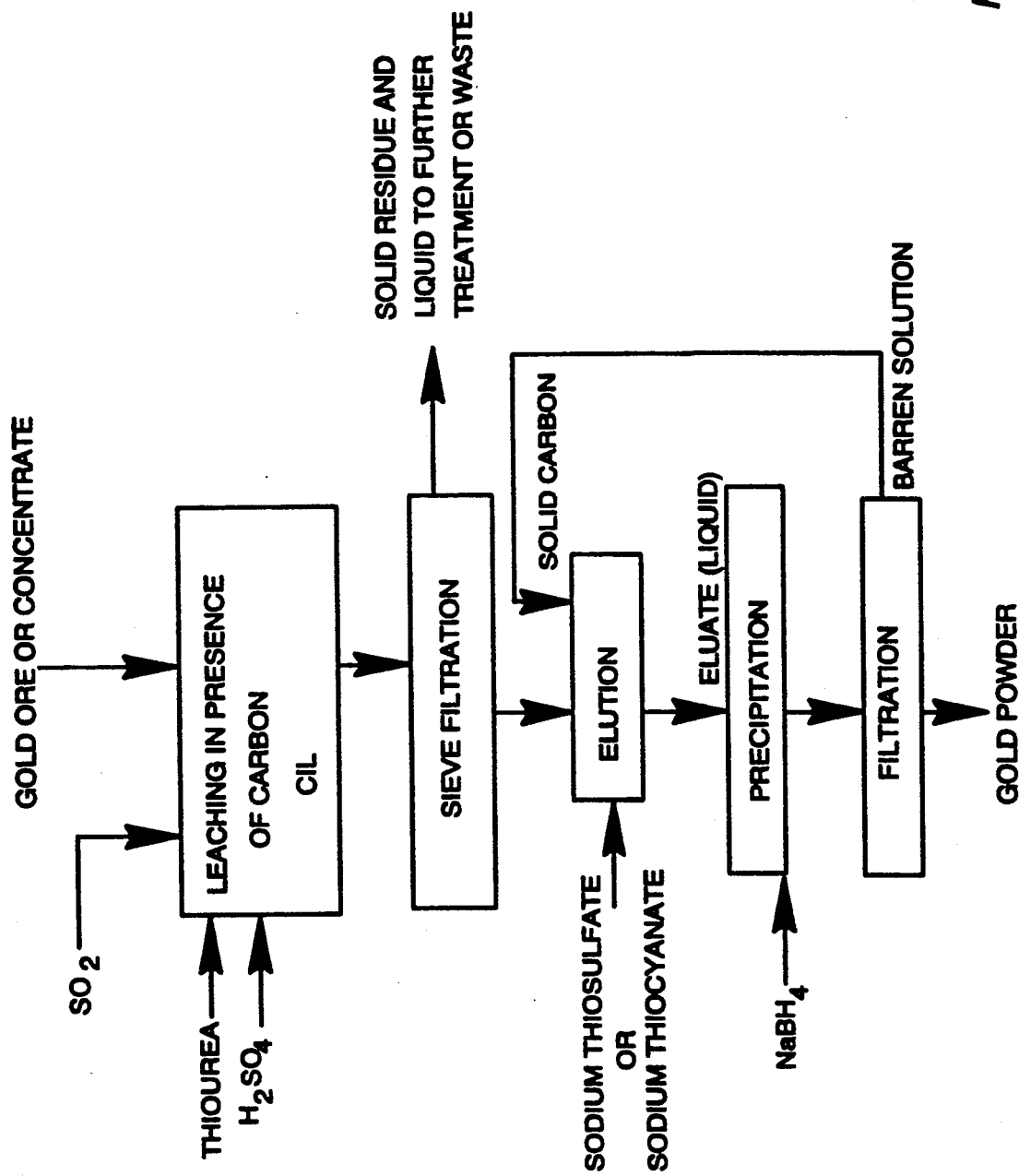
FIG. 2 shows a process flowsheet for the leaching of gold ore or concentrate with acidified thiourea in the presence of carbon including a recovery step as embodied by the invention.

In the embodiment shown in FIG. 2, gold ore or concentrate is leached with acidified thiourea in the presence of carbon (conventional CIL method). Carbon is separated by sieve filtration and the remaining ore residue and liquid is further treated or expelled as waste. The separated carbon is eluted with sodium thiosulfate or sodium thiocyanate and the resultant eluate is then separated and treated with stabilized sodium borohydride to induce reduction precipitation. The precipitated gold powder is recovered by filtration. Optionally, the barren solution can be recycled to the upstream (stripping) elution stage.

Figure 3:
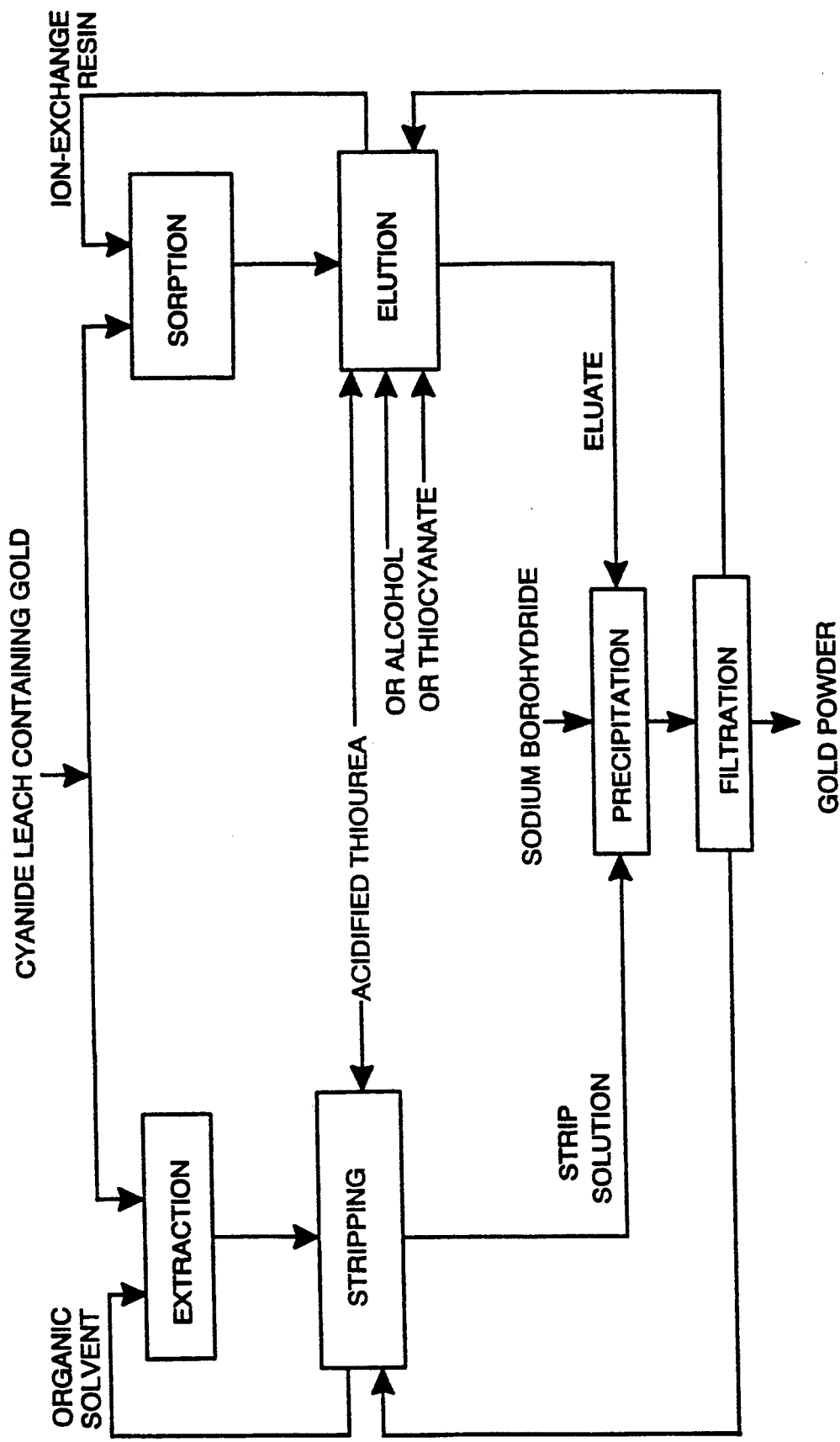
FIG. 3 shows a process flowsheet for the treatment of gold-containing cyanide leach liquor for the purpose of recoving gold as embodied by the invention.

With reference to FIG. 3, in further embodiments of invention gold-containing cyanide leach liquor is treated by either of two methods:

1) The leach liquor is treated with an organic solvent to extract gold therefrom. The loaded organic phase is stripped with acidified thiourea solution. The gold-containing thiourea strip solution is treated with stabilized sodium borohydride to induce reduction precipitation of gold. The precipitated gold metal powder is recovered by filtration. Optionally, the strip solution is recycled to the upstream stripping stage.

2) The gold-containing cyanide leach liquor is treated with an appropriate resin resulting in the sorption of gold thereon. The loaded ion-exchange resin is separated and eluted with acidified thiourea, alcohol-containing solution or thiocyanate. Gold powder precipitate is formed as a result of the treatment of the eluate with stabilized sodium borohydride to induce reduction precipitation. Gold powder is recovered by filtration and the barren eluate is optionally recycled to the upstream eluting stage.

Figure 4:
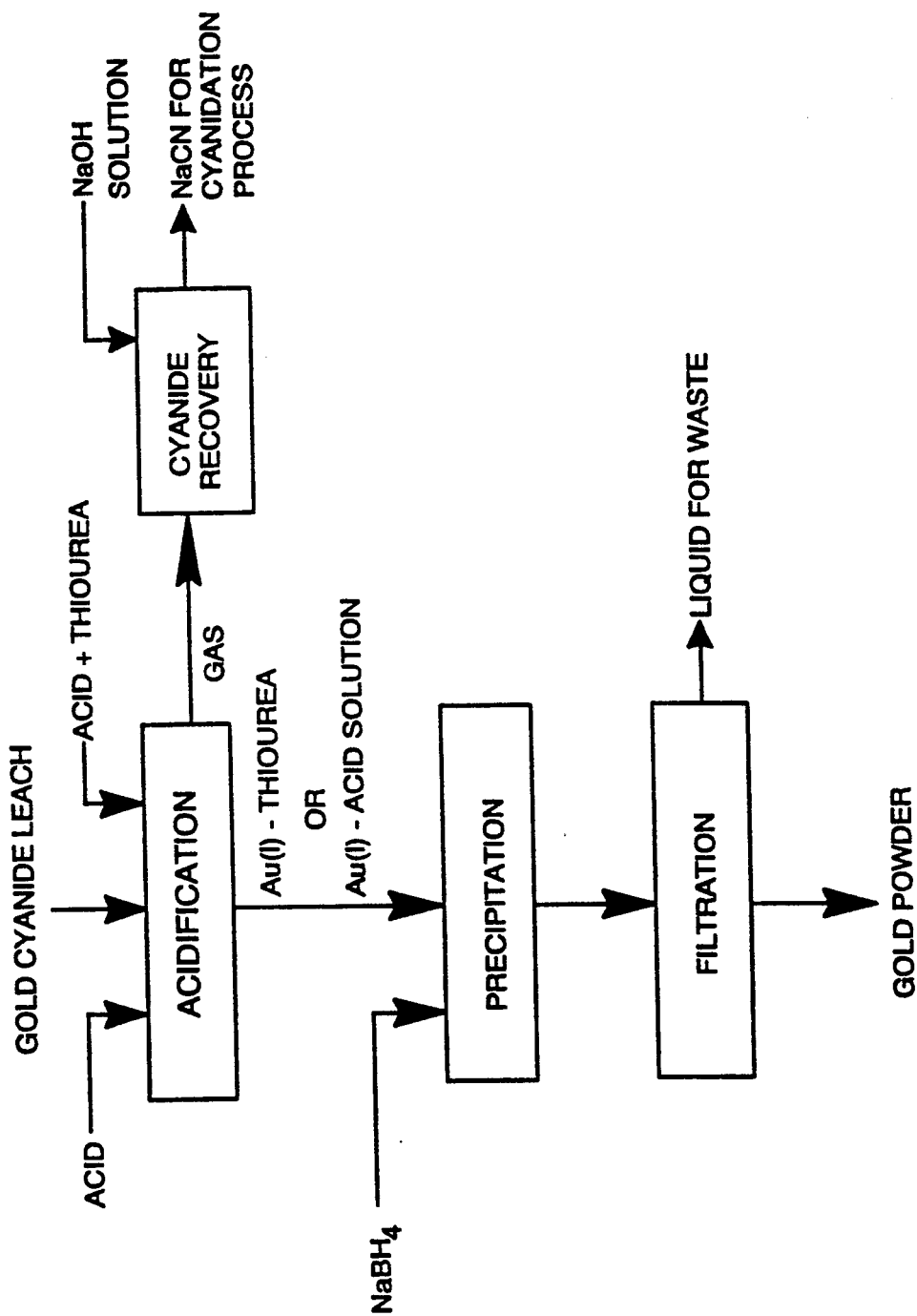
FIG. 4 shows a process flowsheet for an additional method of treatment of gold-containing cyanide leach liquor which incorporates a recovery step as embodied by the invention.

In the embodiment of invention shown in FIG. 4, gold-containing cyanide leach liquor is treated with acid or acidified thiourea. Liberated hydrogen cyanide gas is recovered by treatment with sodium hydroxide solution to form sodium cyanide which can be recycled for use in the cyanidation of gold. The liquid stream from the acidification process (either Au (I) - thiourea or Au (I) - acid solution) is treated with stabilized sodium borohydride to effect reduction precipitation. Precipitated gold powder is recovered by filtration and the filtrate is expelled as waste.

The following examples further illustrate the invention:

EXAMPLE 1

A 100 ml test solution containing 100 mg/L Au and 7g/L thiourea solution at pH 1.5 was stirred gently by a magnetic bar. A calculated amount of stabilized sodium borohydride in the form of Ven Met TM solution was added to the test solution which immediately resulted in the formation of a fine black precipitate. The product was separated on filter paper and analyzed by x-ray diffraction. It was revealed to be substantially pure metallic gold. Scanning electron microscope analysis also revealed that the particles were very fine with a diameter of less than 1 µ.

EXAMPLE 2

Recent studies have shown that gold can be extracted from cyanide leach liquor by either solvent extraction or ion exchange techniques. (P. A. Riveros, "Studies on the Solvent Extraction of Gold from Cyanide Media", *J. of Hydrometallurgy*, CANMET/MSL Division Report MSL 88-141 (J), (1988), in press. and P. A. Riveros, "Advances in Ion-Exchange and Solvent Extraction for Gold Recovery", CANMET/MSL Divison Report MSL 88-109 (OP&J), (1988)). Gold and associated impurities can be stripped from the loaded organic phase or ion exchange resin by acidified thiourea solution. On such solutions, reduction precipitation was effected by the addition of stabilized sodium borohydride. The procedure involved pH adjustment to the limit of precipitation, the addition of small amounts of Ven Met TM solution and filtration to separate the resultant precipitate. With reference to Table 4, it can be seen that reaction was very efficient; 90% of the gold was precipitated from the strip solution based on the addition of 1.25 moles of stabilized sodium borohydride per mole of gold. Analysis revealed the product to have a purity of greater than 98.0%. Recovery could be increased even further by the addition of excess sodium borohydride.

The process for treating gold-containing eluate solution of loaded resin was treated in a similar manner. Table 5 shows the results. Gold was substantially completely recovered; the barren solution contained less than 2 mg/L gold. Furthermore, product analysis revealed the precipitate to be pure.

TABLE 4

Reduction of gold from 0.5 M thiourea strip solution by SBH
V = 25 mL, initial pH = 0.2 adjusted with NaOH to pH = 0.8, time = 5 min at room temperature, mL of VenMet = 0.1 mL (SBH/Au = 1.25)

|  | Au | Zn | Cu | Ni | Fe |
|---|---|---|---|---|---|
| Composition of strip solution (mg/L) | 1940 | 960 | 72.2 | 247.6 | 33.2 |
| Composition solution after adding SBH (mg/L) | 203 | 960 | 68.9 | 247.0 | 3.2 |
| Recovery, % | 89.5 | 0.0 | 4.5 | 0.0 | 90.5 |
| Purity of the product, % | 98.12 | 0.0 | 0.19 | 0.0 | 1.69 |

TABLE 5

Reduction of gold from 0.5 M thiourea eluate solution by SBH
Initial pH = 0.24 then adjusted to Ph = 2.5 by NaOH, V = 25 mL, time = 5 min at room temperature, SBH/Au = 3.75

|  | Au | Zn | Cu | Ni | Fe |
|---|---|---|---|---|---|
| Composition of eluate, mg/L | 128 | 345.3 | 4.18 | 4.29 | 3.36 |
| Composition after SBH, mg/L | 1.82 | 269.3 | 5.54 | 5.05 | 4.30 |
| Recovery, % | 98.6 | 22.0 | 0.0 | 0.0 | 0.0 |
| Purity, % | 62.4 | 37.6 | 0.0 | 0.0 | 0.0 |

I claim:

1. A process for recovering high purity metallic gold from an acidic solution of thiourea, thiosulfate, thiocyanate or thiourea leach liquor containing gold values, which comprises:
    treating the solution with stabilized alkali metal borohydride in an amount at least stoichiometrically equal to the amount of gold present in solution; separating by filtration the resultant metallic precipitate; and, optionally, recycling the barren solution to the upstream process.

2. A process as claimed in claim 1, wherein the stabilized alkali metal borohydride is stabilized potassium borohydride.

3. A process for recovering high purity metallic gold from an acidic solution of thiourea, thiosulphate, thiocyanate or thiourea leach liquor containing gold values, which comprises:
    treating the solution with stabilized alkali metal borohydride in an amount at least stoichiometrically equal to the amount of gold present in the solution;
    separating by filtration the resultant metallic precipitate; and, optionally,
    recycling the barren solution to the upstream process, wherein the stabilized alkali metal borohydride is sodium borohydride in the form of a stabilized aqueous sodium borohydride/sodium hydroxside solution.

4. A process for recovering high purity metallic gold from an acidic solution of thiourea, thiosulphate, thiocyanate or thiourea leach liquor containing gold values, which comprises:
    treating the solution with stabilized alkali metal borohydride in an amount at least stoichiometrically equal to the amount of gold present in the solution;
    separating by filtration the resultant metallic precipitate; and, optionally,
    recycling the barren solution to the upstream process, wherein the stabilized solution contains about 12% by weight of sodium borohydride and about 40% by weight of sodium hydroxide.

5. A process as claimed in claim 1, 3 or 4, wherein the acidic solution is a leach solution obtained in the final recovery step of the acidified thiourea leaching of gold ore or concentrate in the presence of carbon followed by elution of the carbon by thiosulfate or thiocyanate.

6. A process as claimed in claim 1, 3 or 4, wherein the acidic solution is obtained as a result of the acidification of gold cyanide leach liquor by acidified thiourea which incorporates a cyanide gas recovery means.

7. A process as claimed in claim 1, 3 or 4, wherein the acidic solution is obtained in the final recovery step of either the extraction of cyanide leach liquor by an organic solvent followed by stripping of the organic phase by acidified thiourea or the treatment of cyanide leach with ion-exchange resin followed by elution of the resin by acidified thiourea or thiocyanate.

8. A process as claimed in claim 1, 3 or 4, wherein the treatment of the acidic solution with stabilized alkali metal borohydride is effected at ambient temperature and pressure.

9. A process as claimed in claim 1, 3 or 4, wherein the acidic solution contains gold in a concentration range of 2 mg/L to about 2 g/L.

10. A process as claimed in claim 1, 3 or 4, wherein the acidic solution is a thiourea or thiocyanate solution and has a pH in a range of 1.5 to 3.0.

11. A process as claimed in claim 1, 3 or 4, wherein the acidic solution is a thiosulfate solution and has a pH of about 6.0.

12. A process as claimed in claim 1, 3 or 4, wherein the acidic solution also contains silver values and/or any of zinc, iron, cobalt, nickel or copper ions.

13. A process for recovering high purity metallic gold from an acidic solution of thiourea, thiosulphate, thiocyanate or thiourea leach liquor containing gold values, which comprises:

treating the solution with alkali metal borohydride in an amount at least stoichiometrically equal to the amount of gold present in the solution;

separating by filtration the resultant metallic precipitate; and, optionally, recycling the barren solution to the upstream process.

14. A process as claimed in claim 13, wherein the alkali metal borohydride is sodium borohydride in the form of a stabilized aqueous sodium borohydride/sodium hydroxide solution.

15. A process as claimed in claim 14, wherein the stabilized solution contains about 12% by weight of sodium borohydride and about 40% by weight of sodium hydroxide.

16. A process as claimed in claim 13 wherein the alkali metal borohydride is stabilized potassium borohydride.

17. A process as claimed in claim 13, wherein the acidic solution is a leach solution obtained in the final recovery step of the acidified thiourea leaching of gold ore or concentrate in the presence of carbon followed by elution of the carbon by thiosulfate or thiocyanate.

18. A process as claimed in claim 13, wherein the acidic solution is obtained as a result of the acidification of gold cyanide leach liquor by acidified thiourea which incorporates a cyanide gas recovery means.

19. A process as claimed in claim 13, wherein the acidic solution is obtained in the final recovery step of either the extraction of cyanide leach liquor by an organic solvent followed by stripping of the organic phase by acidified thiourea or the treatment of cyanide leach liquor with ion-exchange resin followed by elution of the resin by acidified thiourea or thiocyanate.

20. A process as claimed in claim 13, wherein the treatment of the acidic solution with alkali metal borohydride is effected at ambient temperature and pressure.

21. A process as claimed in claim 13, wherein the acidic solution contains gold in a concentration range of 2 mg/L to about 2 g/L.

22. A process as claimed in claim 13, wherein the acidic solution is a thiourea or thiocyanate solution and has a pH in a range of 1.5 to 3.0.

23. A process as claimed in claim 13, wherein the acidic solution is a thiosulfate solution and has a pH of about 6.0.

24. A process as claimed in claim 13, wherein the acidic solution also contains silver values and/or any zinc, iron, cobalt, nickel or copper ions.

* * * * *